June 13, 1967  J. J. S. SMITH ETAL  3,324,651
TURBOCHARGED INTERNAL COMBUSTION ENGINE Filed May 7, 1965  2 Sheets-Sheet 1

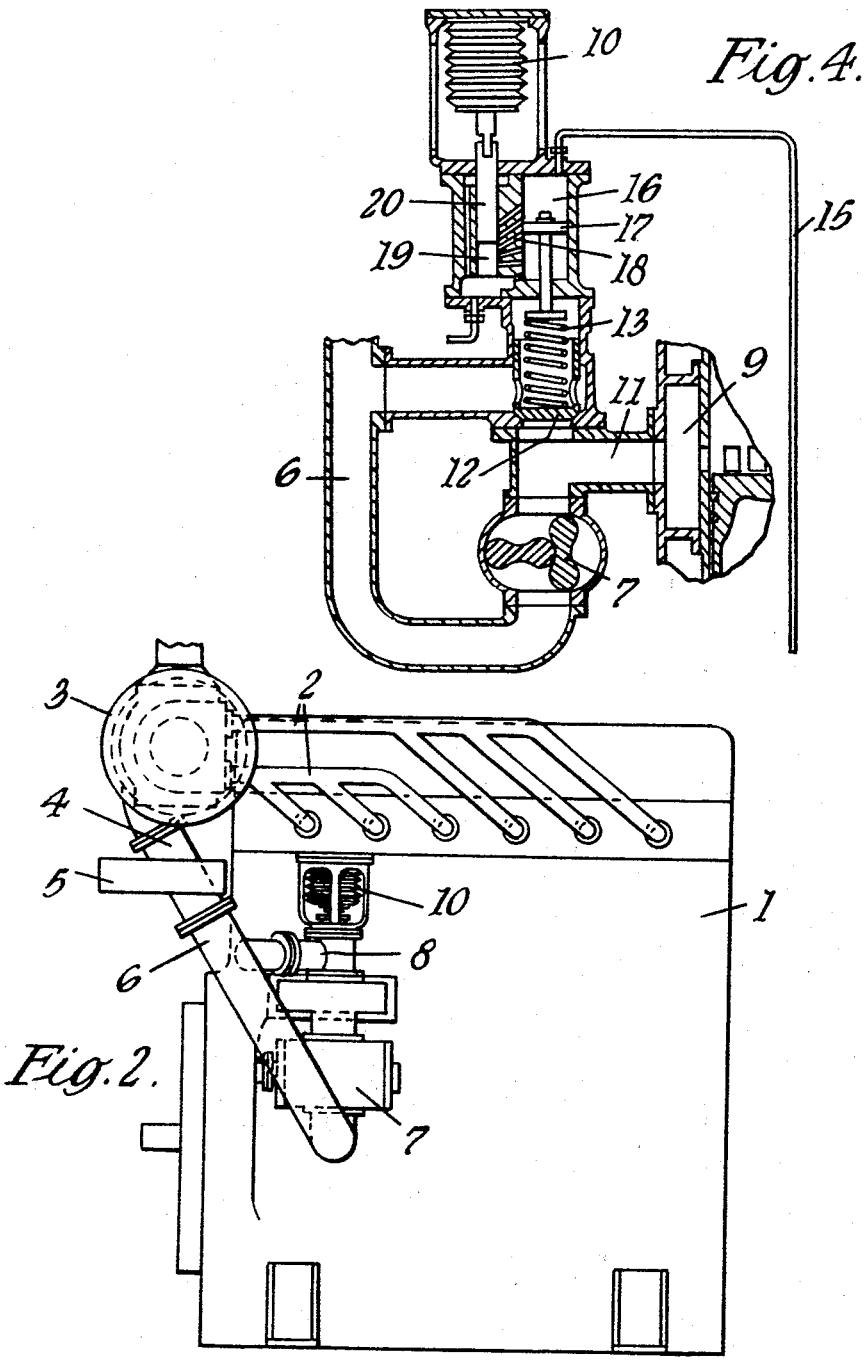

3,324,651
TURBOCHARGED INTERNAL COMBUSTION ENGINE

James John Stewart Smith and Donald Wilfred Tryhorn, Slough, England, assignors to Sir W. G. Armstrong Whitworth & Co. (Engineers) Limited, Slough, England, a British company
Filed May 7, 1965, Ser. No. 453,973
Claims priority, application Great Britain, May 15, 1964, 20,406/64
6 Claims. (Cl. 60—13)

ABSTRACT OF THE DISCLOSURE

In a supercharging system for an internal combustion engine having a turbo-blower operated by the engine exhaust supplying air to a positive displacement compressor, and having means to hold the pressure rise from the compressor intake to the compressor discharge to a constant, the addition of means operated upon by the ambient barometric conditions to adjust the pressure rise between the compressor intake and discharge according to the requirements of changes in ambient barometric conditions.

---

The invention relates to internal combustion engines of the compression ignition type while the object of the invention is to provide a compression ignition engine which has its air supply automatically adjusted for maintenance of rated power with change of ambient conditions.

It has been generally accepted that air breathing engines such as internal combustion engines in their standard form require to be derated in power output when they are scheduled to run at higher altitudes, where the lowering of the atmospheric pressure reduces the weight of the trapped air charge in the cylinder. It is also generally accepted that a turbocharger matched to suit the engine requirement can compensate for the reduced atmospheric pressure by increasing the quantity of air passed to and trapped by the engine, but the problem exists in that the same turbocharger equipment is not suitable for more than a small change in atmospheric pressure. It therefore follows that if derating has not to take place, change of turbocharger matching is required for variations in atmospheric conditions. This method of compensating for changes in atmospheric pressure and/or temperature is sometimes possible if costly for stationary engines, but for automotive or transportable engines it is impractical. The air supply to the engine depends upon the ambient air density. This air density is affected by both pressure and temperature and although it is recognised that temperature affects the density, pressure variations generally cause the greater change and to simplify the description of the invention pressure changes only will be referred to throughout.

A further object of the invention is to provide a turbocharged internal combustion engine of the compression ignition type, in which the air supply to the engine cylinders is so controlled that its weight per cycle for a given rated output and engine speed remains within the same practical limit with change of ambient pressures.

To carry out this method of eliminating or decreasing the derating of engines for altitude, an atmospheric density sensing device such as a bellows is used to control the pressure difference between the air leaving and the air entering the engine driven compressor when this is run in series with a turbocharger. This altitude correcting device may be used in conjunction with any one of the engine charging systems described in co-pending U.S. application Ser. No. 580,128 which is a continuation of U.S. application Ser. No. 376,890. These are either engine driven compressors of the variable throughput type, or fixed throughput with variable speed drive or fixed throughput with a recirculating valve. In each case the barometric device varies the loading on the spring which determines the pressure difference between the delivery from and the inlet to the engine driven compressor. The proposed system will be described in detail as applicable to the fixed throughput compressor with a recirculating valve.

The invention consists in an internal combustion engine of the compression ignition type the exhaust gases of which are utilised to operate an exhaust gas turbine which drives a compressor for the engine supercharging medium and in which such medium passes to the engine by way of an engine driven compressor characterised in that air density sensitive means is provided for controlling the pressure difference between the inlet to and the outlet from the engine driven compressor in such a way that above a given speed it will prevent substantial change in pressure difference with change in engine speed and load and that the said pressure difference will vary inversely with change of ambient air density.

The invention further consists in an engine as set forth above in which the pressure difference between the inlet to and outlet from the engine driven compressor is prevented from changing appreciably with change in engine speed and load by reason of the fitting of an air recirculation device which can connect the inlet to and outlet from the engine driven compressor and which is acted upon by the pressure on both sides of the compressor and that this pressure difference is controlled for adjustment according to the ambient density prevailing.

The invention still further consists in an engine as set forth above in which the controlled pressure difference between the inlet to and the outlet from the engine driven compressor is varied according to the ambient pressure prevailing by the employment of a barometric device on which the ambient density acts and by way of which the load setting on the recirculation valve can be altered.

The invention still further consists in an engine as set forth above, in which the barometric device on which the atmospheric pressure acts, controls a servo system valve which in turn controls the load on the recirculation valve.

The engine driven compressor, referred to throughout this specification, can conveniently be of the positive displacement type of the kind known as the Roots. Alternatively, other known positive displacement blowers or centrifugal blowers may be employed. The size of this machine should suit the proposed high altitude operation and may well be greater than that used for normal low altitude operation.

Different laws of controlling the pressure on the recirculating valve can be obtained by pressure control devices such as piston valves having differential piston areas and working against variable or constant rate springs with the operating pressure being automatically adjusted to suit varying ambient pressures.

The accompanying drawings show, by way of example only, two embodiments of the invention in which:

FIGURE 2 is a side elevation of the engine of FIGURE 1.

FIGURE 4 is an enlarged view of the recirculating valve of FIGURES 1 and 2 and an alternative atmospheric readjustment control means.

Figure 1:
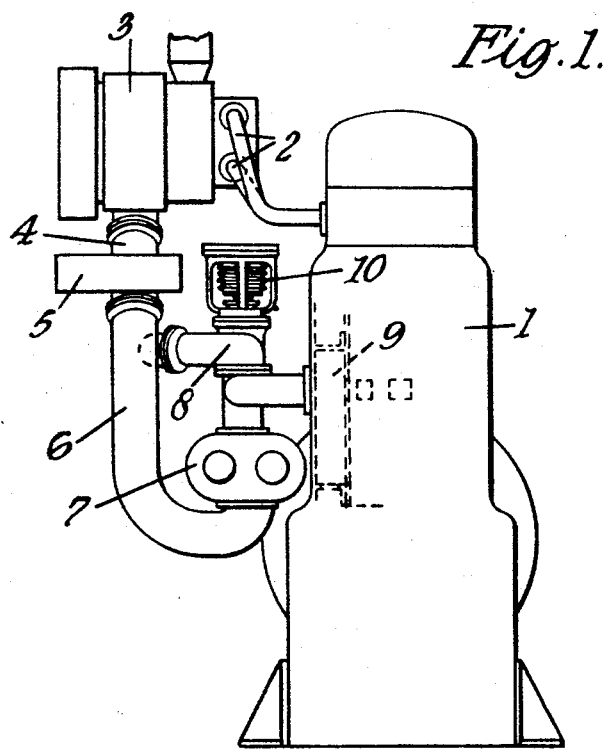
FIGURE 1 shows an end elevation of an engine constructed in accordance with the invention having an engine driven positive displacement compressor of the constant displacement type with a recirculating valve controlled for pressure setting by a sealed bellows the force exerted by which varies according to the ambient pressure prevailing.

The engine may be of the two-stroke cycle or four-stroke cycle type; that shown by 1 in FIGURES 1 and 2, is of the two-stroke cycle type. The outflowing exhaust gases are led from the engine's exhaust valve means through normal manifolds 2, although these could be of the capacity type, to an exhaust driven turbocharger 3 before exhausting to atmosphere. The air charge from the exhaust driven compressor is led through ducting 4 and air charge cooler 5, although a cooler is not essential, and the ducting 6 to an engine driven positive displacement compressor 7 of the constant displacement type, while a recirculating valve arrangement 8 is provided which connects the air chest 9, with the inlet side of the compressor at a predetermined pressure difference which varies according to the ambient pressure prevailing in the atmosphere, by means of a pressurised sealed bellows 10 acting on the recirculating valve, by means of a push rod, and recirculates the air from the delivery side of the positive displacement compressor to the inlet side thereof.

Figure 3:
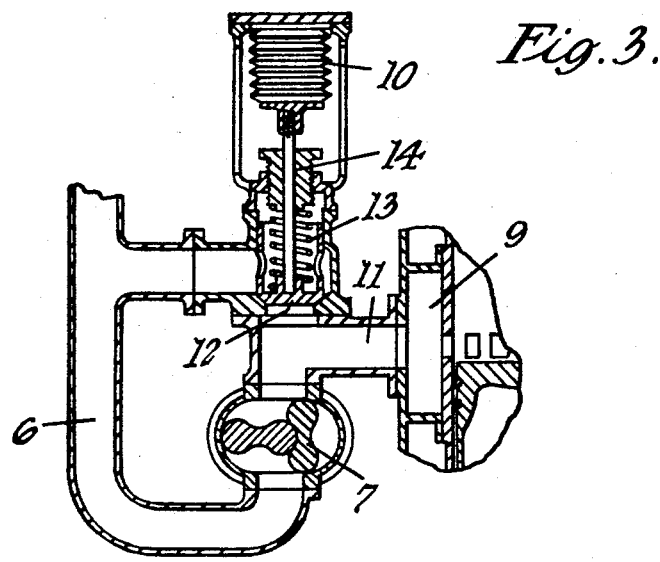
FIGURE 3 is an enlarged view of the recirculating valve and pressure readjustment control means which is dependent on the atmospheric pressure prevailing of FIGURES 1 and 2.

The valve arrangement as shown in FIGURE 3, is a sectional enlargement of valve arrangement 8 and sealed bellows 10 of FIGURES 1 and 2. The valve 12 comes into operation when the pressure in ducting 11 exceeds the pressure in ducting 6 by an amount which is predetermined and which is dependent on the load resulting from the pressure on the effective areas of the two sides of the piston valve 12, the set load of the compression spring 13 and the load exerted by push rod 14 from the forces exerted by the sealed bellows 10, in accordance with the difference in pressure and temperature between that in the bellows and the ambient pressure.

There are many known methods by which the atmospheric pressure can be made to influence the action of a mechanism. The example described above is of the direct acting type and the example now to be described is of the indirect action type in which a servo assisted actuator is employed.

The valve arrangement as shown in FIGURE 4 is an alternative means to that shown in FIGURE 3 of controlling the difference in pressure between ducting 11 and 6 and when the pressure in ducting 11 exceeds by a predetermined amount the pressure in ducting 6, valve 12 opens against load of compression spring 13 which varies according to the pressure prevailing in the atmosphere by means of a servo control system in which pressure oil from an engine driven pump, which could be the normal engine lubricating oil pump, is connected by pipe 15 to cylinder 16 and pressurises piston 17 the position of which varies in the cylinder 16 and which varies the load on spring 13. The position of piston 17 in cylinder 16 is controlled by valve 20 which is connected to sealed bellows 10 which lengthens or contracts according to the pressure and/or temperature prevailing in the atmosphere and in so doing positions the valve 20 in its housing 19 relative to porting 18 and since this controls the height at which oil can escape from cylinder 16 via porting 18 a sensitive control of the predetermined loading on spring 13 is achieved. The position of the ports 18 determines the law of spring loading to ambient pressure and can be made to suit engine requirements.

The invention may be applied to the two-stroke cycle series turbocharged engine and the general arrangement of the engine may be substantially in accordance with any known type in which the fresh charge is provided by a compressor driven by an exhaust gas turbine running in series with an engine driven compressor. The normal arrangement for conveying the fresh charge from the turbo compressor to the air chest surrounding the cylinders may be employed and may or may not incorporate an air charge cooler.

The engine, as shown in FIGURES 1 and 2 has a valve arrangement 8, shown enlarged in FIGURE 3 which connects the air chest 9 with the inlet side 6 of the engine driven constant displacement compressor at a pressure difference, which varies according to the atmospheric pressure prevailing and recirculates the air from the delivery side of the compressor to the inlet side. With the turbocharger matched to suit engine running conditions at peak altitude the recirculating valve spring load is set in conjunction with the load provided by the bellows 10 for recirculation of the air from the delivery ducting 11 to the inlet ducting 6 of the Roots blower at a given pressure difference. At lower altitudes the weight of charge required for the rated output and that set for the peak altitude condition remains the same, and to compensate for the greater density of the air delivered by the turbocharger the bellows 10 contracts and in doing so reduces the closed setting load on valve spring 13, and thereby reduces the pressure difference at which recirculation takes place between the delivery ducting 11 and inlet ducting 6 of the Roots blower. The reduced pressure rise through the Roots blower brings about a delivered charge weight similar to that already determined for peak altitude running.

The same engine driven compressor and turbocharger match without the proposed valve leads to too rapid build up in charge pressure with increased engine speed and load at low altitudes. This limits the performance of the engine as set by turbocharger speed and engine peak pressures to less than can be obtained with the proposed valve and causes the efficiency to be lower.

It is to be understood that the above description is by way of example only, and that details for carrying the invention into effect may be varied without departing from the scope of the invention claimed.

We claim:

1. In an air supply and scavenging system for an internal combustion engine of the compression ignition type in which an exhaust drive blower is provided to raise the combustion and scavenging air from an ambient barometric condition to an initial pressure dependent on the engine speed and load, duct means leading the combustion and scavenging air from said blower to an engine driven compressor, and further duct means leading said air at a higher pressure to said engine, differential pressure operated means operated by the pressure difference between said initial pressure and said higher pressure to regulate the pressure rise due to said compressor, and barometric means operated by variations of the ambient barometric conditions acting upon said differential pressure means to adjust the amount of the pressure rise due to said compressor, in order to compensate for changes in ambient barometric conditions.

2. The system of claim 1 in which the differential pressure operated means is a spring biased valve, and the barometric means comprises an expansible and contractable member which expands as the ambient barometric pressure falls, said barometric means being mounted to adjust the bias of the spring more strongly as the barometric pressure falls.

3. In combination, a compression ignition engine having an air intake and an exhaust, an exhaust gas driven blower, and an engine driven compressor having an intake and a discharge, duct means connecting said blower to the intake of said compressor to provide air to said compressor under an initial raised pressure, further duct means connecting the discharge of said compressor to said air inlet of said engine, means operated upon by the pressures in said compressor intake and said compressor discharge to regulate the pressure difference therebetween, and further means operated by ambient barometric conditions to automatically adjust said means operated upon by the pressures in said compressor intake and said compressor discharge, said further means operated by ambient barometric means being arranged to adjust said means operated upon by the pressures in said compressor intake and discharge, in the sense opposite to the change in the ambient barometric conditions to provide a higher pressure rise between said intake and discharge upon reduction of the ambient barometric pressure.

4. The combination of claim 3 in which said further means operated by ambient barometric pressure includes a bellows device, and said means operated upon by the pressures in said compressor intake and discharge includes a biasing spring to bias said means operated upon by the pressures in the compressor intake and compressor discharge, said bellows device operating on said biasing spring to provide stronger biasing by the spring as said bellows device elongates as the ambient barometric conditions provide a lower barometric pressure.

5. The combination of claim 3 in which said further means operated by ambient barometric pressure includes a bellows device and a servo motor means actuated by said bellows device, and said means operated upon by the pressures in said compressor intake and discharge includes a biasing spring to bias said means operated upon by the pressures in the compressor intake and compressor discharge, said bellows device operating on said biasing spring to provide stronger biasing by the spring as said bellows device elongates as the ambient barometric conditions provide a lower barometric pressure.

6. In combination, a compression ignition engine having an air intake and an exhaust, an exhaust gas driven blower, and an engine driven compressor having an intake and a discharge, duct means connecting said blower to the intake of said compressor to provide air to said compressor under an initial raised pressure, further duct means connecting the discharge of said compressor to said air inlet of said engine, means operated upon by the pressures in said compressor intake and said compressor discharge to regulate the pressure difference therebetween, and further means including servo motor means operated by ambient barometric conditions to automatically adjust said means operated upon by the pressures in said compressor intake and said compressor discharge, said further means operated by ambient barometric means being arranged to adjust said means operated upon by the pressures in said compressor intake and discharge, in the sense opposite to the change in the ambient barometric conditions to provide a higher pressure rise between said intake and discharge upon reduction of the ambient barometric pressure.

References Cited

UNITED STATES PATENTS

| | | |
|---|---|---|
| 2,267,437 | 12/1941 | Alfaro. |
| 2,311,936 | 2/1943 | Elfes _____ 123—119 |
| 2,924,069 | 2/1960 | Buchi _____ 60—13 |
| 3,018,617 | 1/1962 | Kelgard _____ 60—13 |

MARK NEWMAN, *Primary Examiner.*

RALPH D. BLAKESLEE, *Examiner.*